United States Patent [19]
Kack et al.

[11] 3,771,203
[45] Nov. 13, 1973

[54] METHOD OF MANUFACTURE OF DOWN INSULATED GOODS

[75] Inventors: James W. Kack; Terry W. Mowbray, both of Boulder, Colo.

[73] Assignee: Holubar Mountaineering, Ltd., Boulder, Colo.

[22] Filed: Mar. 20, 1972

[21] Appl. No.: 236,080

[52] U.S. Cl............................ 28/77, 5/343, 5/355, 53/27
[51] Int. Cl............................................ D06m 17/00
[58] Field of Search ................. 53/27; 28/77; 5/343, 5/355

[56] References Cited
FOREIGN PATENTS OR APPLICATIONS
797,704  2/1936  France ................................... 5/355
800,989  12/1950  Germany ............................... 5/355

Primary Examiner—Robert R. Mackey
Attorney—Richard D. Law

[57] ABSTRACT

A method of manufacturing insulated goods with down filling, which comprises initially forming packets of a predetermined amount of down compressed into a predetermined size, which packets are placed in compartments for down in the goods. The compartments are completely closed for containing down, and the packet of down in each compartment is then ruptured by striking it, permitting the down to release into the compartment. Subsequent immersion of the down insulated goods in a solvent for the packet material dissolves such material leaving only down in the compartment.

10 Claims, 7 Drawing Figures

METHOD OF MANUFACTURE OF DOWN INSULATED GOODS

The use of down insulated goods which includes garments and other materials such as sleeping bags, etc., has increased greatly as the public has increased outdoor activity. It is well known by most outdoorsmen that down filled cloth goods are the lightest and the warmest of all types of outdoor cold weather gear. The down filled goods are not only light but are compressible to small volumes. The manufacture of the down insulated goods involves considerable hand labor, and, therefore, the cost of such goods greatly exceeds the cost of other types of insulated goods. Only a few manufacturers have specialized in the manufacture of down insulated materials, and recently they have entered the do-it-yourself hobbyist market, where the materials are provided for the individual to make his own personal jacket, sleeping bag, etc.

Down is a remarkable material, particularly the finest which is goose down, compressible to a small volume but rebounding to full volume immediately on release. However, this is a quality which makes it a difficult material to work with, and which requires considerable hand work in making insulated goods. For the do-it-yourself kits made by several manufacturers, the cloth goods are cut to approximate size and shape only, and the purchaser receives a container of the down which is to be placed into the sewn garment, and then places the down into compartments. These filled compartments are sewn closed. The transfer of the down from the shipping container to the garment or compartment in the material produces several problems, and usually messy problems.

Down insulated goods contain from a few ounces of down for mittens to three or more pounds of down for sleeping bags. Good quality down, which is usually mature, northern, winter harvested goose down, occupies about 4,800 cubic inches per half pound when in uninhibited condition. Thus, it is seen that lightness and volume of down forms one of the problems of working with it.

In accordance with the present invention, there is provided a method of manufacturing down insulated goods, particularly adaptable for do-it-yourself hobbyists, wherein down is compressed and packaged in a packet formed of a soluble film. These packets are sewn, intact, in the compartments in the fabric of the goods. The packets may be ruptured when the compartments are sewn completely closed. When the packet is ruptured, the down is released, filling the compartment. Subsequent cleaning operations, or merely immersing the garment in a solvent for the packet material, dissolves the packet material leaving clean down in the compartments.

Included among the objects and advantages of the present invention is to provide a method for manufacturing down insulated goods.

Another object of the invention is to provide down for insulated goods in predetermined sizes of packets wherein one packet is used for one insulation compartment in the goods.

Still another object of the invention is to provide a method of manufacturing down insulated goods by providing compressed down, of a reduced volume, in a soluble packet which is sewn in a compartment in the goods and the package is then ruptured releasing the down, and subsequent immersing of the garment in a solvent for the packet material leaves the down and fabric in the compartment clean.

Yet another object of the invention is to provide a method for simply making insulated goods of down suitable for the do-it-yourself market.

An additional object of the invention is to provide a predetermined amount of down compressed in a water soluble packet so that after being sewn in a compartment of the goods the down may be released by rupturing the packet containing the compressed down or by dissolving the packet material in water.

These and other objects and advantages of the invention may be readily ascertained by referring to the following description and appended illustrations in which.

In one form of the invention, illustrated in FIGS. 1 through 6, a packet, shown in general by numeral 10, is formed of tubular film material, sealed at its bottom along a seal line 11 and sealed along the seal line 12 at its top. The packet contains a predetermined amount of down which is to be filled in a predetermined size compartment in a garment. Generally, the packet is of considerably smaller size than the compartment in which it will be placed so that it may be easily placed in the compartment and the compartment sewn shunt. As explained below, the packet may be made of film material which is soluble in a solvent. As an example, a film of polyvinyl alcohol may be used to contain the compressed down, and once in the compartment the polyvinyl alcohol may be dissolved away from the down by immersing the garment in water. As is well known, the polyvinyl alcohol film is made in various thicknesses and the packet may, likewise, be made of film of different thicknesses. Further, while the packet is shown as made from tubular stock having two sealed ends, it is obvious that the packet may be made in any of known methods of making packets where, for example, a seal is formed around the outside of the four sides of two sheets of material in face engagement to form an enclosed package; a film sheet may be center-folded back on itself and the three sides sealed to form a package; etc. In any event, it is necessary that the packet be sealed and hold compressed down therein. The packet is preferably of a lesser size than the compartment into which it will be placed.

Figure 1:
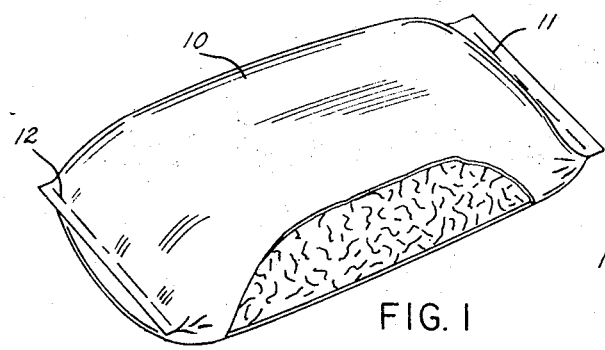
FIG. 1 is a plan view of a tubular packet containing compressed down in a soluble film material formed into packet shape and sealed, containing the down therein.
Figure 2:
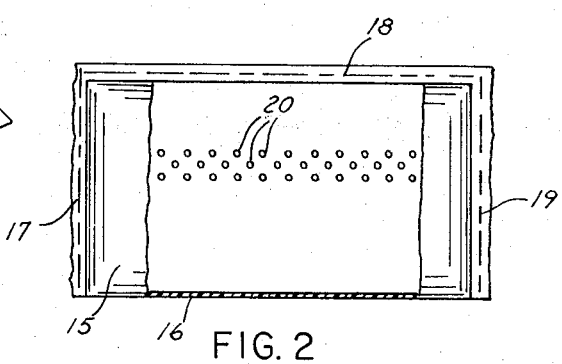
FIG. 2 is a plan view of a center-fold, three sided seal packet for containing down.

In another form, FIG. 2, a center-fold packet 15 is a piece of film folded back on itself along a fold line 16 and is sealed along sides 17, 18 and 19. The packet is formed by folding, sealing two sides, filling with down, and then sealing the third side. The film may be perforated with perforations 20, to aid in rupturing the packet, and dissolving the film in a solvent for the film.

Figure 3:
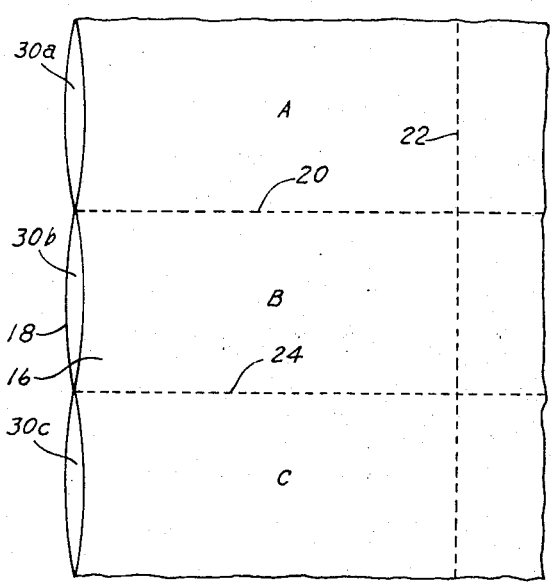
FIG. 3 is a partial plan view of a garment during a first phase of manufacturing, having two pieces of cloth in face engagement and sewn together leaving open sided compartments into which down insulation may be placed.
Figure 4:
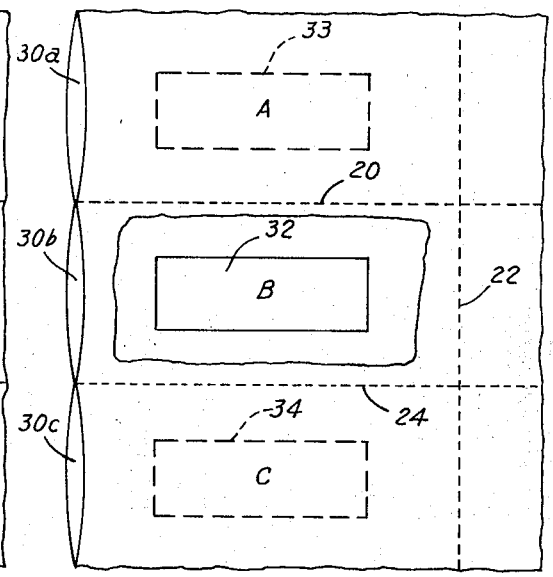
FIG. 4 is a partial plan view of the garment making process showing a second phase of manufacture with a packet of compressed down in each of the open compartments.
Figure 5:
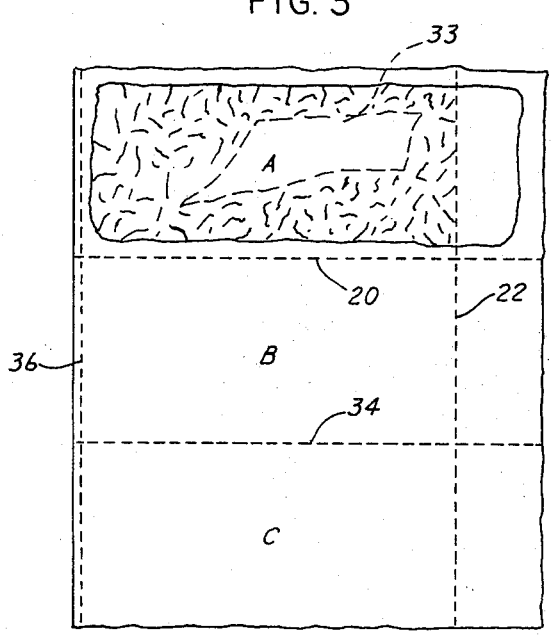
FIG. 5 is a partial plan view of a manufacturing process for a garment showing a third phase, with the compartments sewn up and the down packets ruptured.
Figure 6:
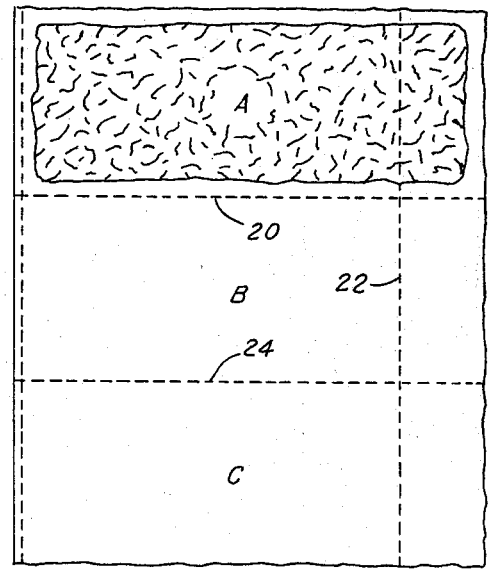
FIG. 6 is a partial plan view of a garment showing the final step in the manufacture, with the packet material removed and the down filling in each compartment.

As illustrated in FIG. 3, three compartments A, B, and C, are formed in partially sewn goods, including material 16 which is placed on top of a similar piece of material 18 and sewn along stitch line 20 separating compartments A and B. A rear sew line 22 separates compartment B from a compartment extending from compartment B. A sewing line 24 separates compartment B from compartment C. The sewing line 22 separates these three compartments from similar compartments to the right. For a do-it-yourself kit, the fabric of a correct size and shape is provided. For example, in a sleeping bag the sheet fabric and the interlining fabric. These fabric pieces are placed together and sewn along the, usually premarked, lines to leave the compartments. The directions of sewing are provided by the manufacturer. A similar situation occurs with jackets and the like, where there will be an outer fabric and an inner fabric, and the two sewn together leaving compartments for down therein. In each case, the compartment is sewn with three sides closed, leaving an open side, for example, open side 30b for compartment B. A packet of compressed down 32, FIG. 4, is placed in the compartment B, and as shown it is of smaller dimensions than the dimensions of compartment B. In similar manner, a packet 33 is placed in compartment A, through open side 30a, and a packet 34 is placed in compartment C through open side 30c. In similar manner, a packet of down is placed in each of the other compartments of the particular garment being manufactured. The openings of the compartments 30a, 30b and 30c, are then sewn together along a sew line 36 extending along the openings 30a, 30b and 30c, completely closing the down packets in the compartments. This is done for all other compartments. Once in the compartments and sealed therein by the sewing, the packets may be ruptured as by clapping your hands over the packet or by placing it on a hard surface and striking the packet sharply, which ruptures the film of the packet releasing the down into the compartment. The packet is easily ruptured by gathering the fabric between two hands and then pulling at the packet's ends. The perforated packet stock aids this procedure. The packets may, also, be broken open by merely bending them in half. Also, after the garment is completely sewn with all of the packets in place in the compartments, the garment may be placed in a solvent for the film dissolving the packet material. After the garment dries from this immersion, the down will be spread uniformly throughout the compartments and will be fluffy and ready for use.

Figure 7:
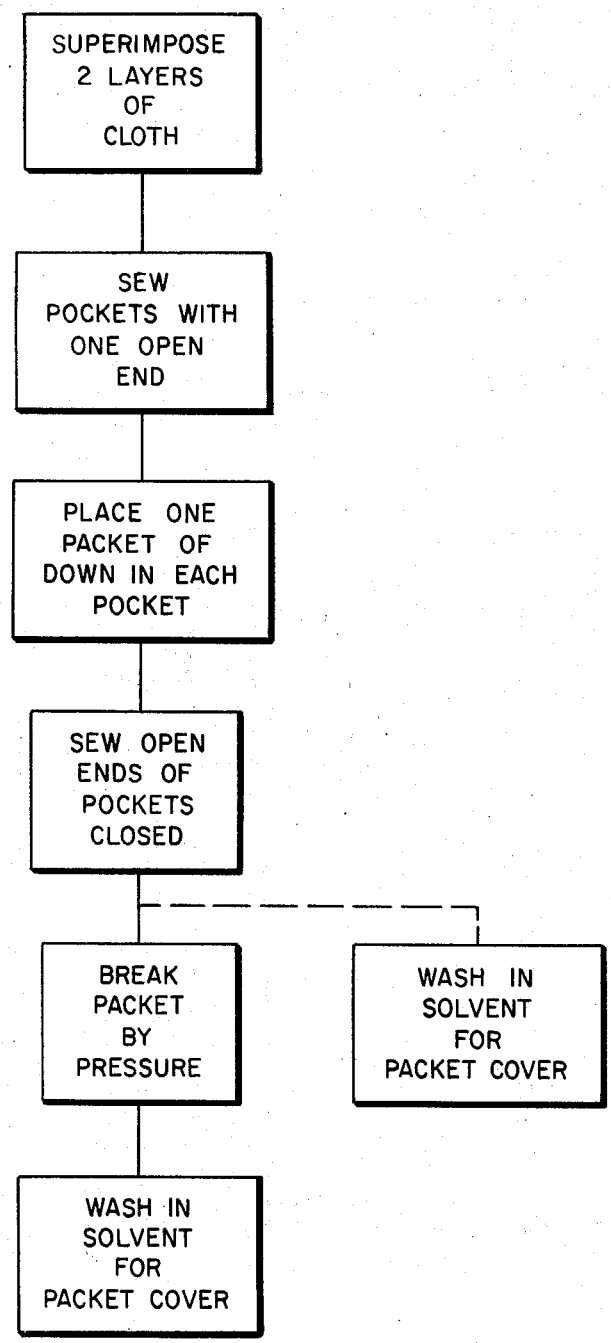
FIG. 7 is a schematic flow diagram in the steps of of the method of placing insulating down in a garment.

The steps of the method are schematically shown in FIG. 7, which initially includes placing an inner and an outer fabric piece on top of each other. This double fabric layer is then sewn so as to produce pockets with open ends. A packet of down is placed in each pocket and the ends of the pockets are sewn closed. The down is released from the packets into the pocket sewn in the materials. One method of releasing the down is to break the packet by pressure, and another method is to wash the garment in solvent for the packet covering without breaking the packet. In the first method, the packet material is removed from the pocket by washing in a solvent for the packet covering.

The packets may be perforated so that the filling of the packet can be accomplished, and these perforations, also, help one in tearing the packet open. Also, the finished garment may be quilted. This creates more compartments to hold the down in place.

In choosing the type of material for packaging the down, lower molecular weight polymeric material is preferred, since in the lower molecular weight polymeric films the material is soluble in a solvent. Thus, the polyvinyl alcohol which contains a high proportion of hydroxyl groups is soluble in water, and in low molecular weight alcohols. Such material is, however, generally insoluble in hydrocarbon solvents. Other water soluble films are useful, e.g., water soluble cellulose, etc. A polystyrene film is generally a pure hydrocarbon, and is essentially insolable in such solvents as water and alcohol, but it is soluble in a hydrocarbon solvent such as benzene and toluene. Generally speaking, as the molecular weight of the polymeric material increases, the solubility decreases and the resistance to solvation increases. Further the solubility of the polymers decreases with increased branching and cross linking of the polymers.

The main function of the film is to contain at least partially compressed down, so it may be easily inserted into a compartment and sewn therein, while the down is retained in the packet. The down is released from the packet either by rupturing the film material of the packet, or simply by immersing the whole garment in a solvent for the material. The packet material is dissolved in the solvent for the film releasing the down, and removing the packet material from the garment.

I claim:

1. A method of placing insulating down in a compartment in a garment comprising packaging down in a soluble film packet sealed against the escape of down therefrom; placing said packet in a down compartment in such a garment; securing said compartment closed and into a down-holding compartment; rupturing said packet in said closed compartment to release down therein; and immersing said compartment in a solvent for said soluble film.

2. A method according to claim 1 wherein said down is compressed in said packet.

3. A method according to claim 2 wherein the dimensions of said packet are substantially less than the compartment into which it is placed.

4. A method according to claim 1 wherein said rupturing is caused by striking or tearing said packet.

5. a method according to claim 1 wherein said film is soluble in water and said solvent is water.

6. A method according to claim 5 wherein said film is a polyvinyl alcohol.

7. A method according to claim 5 wherein said film is a water soluble cellulose.

8. A method according to claim 1 wherein said film is soluble in an organic solvent for such film.

9. A method according to claim 8 wherein said film is a polystyrene.

10. A method according to claim 1 wherein said packet is perforated.

* * * * *

UNITED STATES PATENT OFFICE
CERTIFICATE OF CORRECTION

Patent No. 3,771,203             Dated November 13, 1973

Inventor(s) James W. Kack and Terry W. Mowbray

It is certified that error appears in the above-identified patent and that said Letters Patent are hereby corrected as shown below:

Col. 2, line 49, change "shunt" to --shut--.

Col. 4, line 21, change "insolable" to --insoluble--.

Signed and sealed this 4th day of June 1974.

(SEAL)
Attest:

EDWARD M. FLETCHER, JR.
Attesting Officer

C. MARSHALL DANN
Commissioner of Patents